(12) United States Patent
Strasser et al.

(10) Patent No.: US 6,231,793 B1
(45) Date of Patent: May 15, 2001

(54) POLYMER-DERIVED CERAMIC MATRIX COMPOSITE COMPONENTS

(76) Inventors: Thomas Edward Strasser, 2593 Independence Way, Corona, CA (US) 91720; William Eugene Coonce, 16024 Arcturus Ave., Gardena, CA (US) 90249

(*) Notice: Subject to any disclaimer, the term of this patent is extended or adjusted under 35 U.S.C. 154(b) by 0 days.

(21) Appl. No.: 09/178,863

(22) Filed: Oct. 26, 1998

(51) Int. Cl.[7] .............................. B29C 39/26; B29B 11/06; C08K 3/00; C08K 9/12
(52) U.S. Cl. ..................... 264/45.1; 264/43; 264/45.3; 523/149; 523/216; 524/401
(58) Field of Search ............................ 523/149, 153, 523/216; 524/401; 264/43, 45.1, 45.3

(56) References Cited

U.S. PATENT DOCUMENTS

| | | | |
|---|---|---|---|
| 3,669,638 | 6/1972 | Wong et al. | 65/3 |
| 3,671,615 | 6/1972 | Price | 264/39 |
| 5,102,596 | 4/1992 | Lempfer et al. | 264/115 |
| 5,112,545 | 5/1992 | Spain et al. | 264/103 |
| 5,206,085 | 4/1993 | Nakagawa et al. | 428/372 |
| 5,230,906 | 7/1993 | Mueller | 425/89 |
| 5,391,437 | 2/1995 | Miyasaka et al. | 428/425.5 |
| 5,910,095 | * 6/1999 | Strasser et al. | 264/86 |

* cited by examiner

*Primary Examiner*—Tae Yoon
(74) *Attorney, Agent, or Firm*—Terry J. Anderson; Karl J. Hoch, Jr.

(57) ABSTRACT

A method for rapidly manufacturing "green-state" ceramic matrix composite components, components made from this method, and a resin/catalyst precursor mixture used in the method. The method includes manufacturing a component by preparing the precursor mixture by mixing a requisite quantity of a polymer-derived ceramic precursor resin, a catalyst, a discontinuous reinforcing fiber and filler material, and then loading this precursor mixture in a preheated mold. The precursor mixture then is cured in the mold to form the component which is porous. Thereafter, the component is reinfilitrated with a resin to at least partially fill the pores of the component. This method yields a ceramic matrix composite component that is cured in approximately one minute as well as a resin/catalyst precursor mixture that can be stored in excess of four weeks.

12 Claims, 1 Drawing Sheet

POLYMER-DERIVED CERAMIC MATRIX COMPOSITE COMPONENTS

FIELD OF THE INVENTION

The present invention relates in general to ceramic matrix composite components and more particularly to "green-state" discontinuous fiber ceramic matrix composite components made from a polymer-derived ceramic precursor resin and a method of rapidly manufacturing these components.

BACKGROUND OF THE INVENTION

Ceramic matrix composite (CMC) is a useful material for making components used in many applications including aircraft and automobiles. Moreover, when the CMC is reinforced with fiber the resulting material can be used to make components that are resistant to extremely high temperatures and surprisingly strong and durable. For example, fiber-reinforced CMC can be used to make components such as piston rings, catalytic converters, exhaust manifolds, brake rotors and brake pads.

A CMC component is typically manufactured by mixing a resin with fibers and filler powders to form a mixture. This mixture is then loaded into a mold in the shape of the desired component. Next, the mixture is cured by raising the temperature of the mold and the mixture to the cure temperature of the resin. Curing occurs when the mixture has set enough such that the component is formed.

The newly formed component is then ejected from the mold. At this stage the component is in a "green-state." This means that it has not been pyrolized, or raised to a high enough temperature whereby a ceramic is formed. Thus, in its "green-state" the component is a polymer composite that has structural integrity and can be handled but still needs to undergo pyrolysis before the component can be used.

Generally, this fabrication process takes a substantial amount of time. This is partly because resins, especially polymer-derived ceramic precursor resins, tend to cure rapidly when raised to their cure temperature. Consequently, the mold and the mixture must be cool when the mixture is loaded into the mold to ensure that the resin does not cure prior to closing the mold. Instead, the cool mold and the mixture must be heated to the cure temperature. Typically, this heating takes in excess of one hour due to the thermal mass of the forming tool.

One problem with this manufacturing process for CMC components is that it takes a substantial amount of time to manufacture a CMC component. This relatively long manufacturing time of CMC components is one reason why CMC components have difficulty competing in the marketplace with similar components made from traditional materials. This is despite the fact that CMC components are generally lighter, more durable and more efficient traditional materials in widespread use. For example, a traditional brake pad can be manufactured in a matter of seconds. Conversely, a CMC brake pad, which is more resistant to high temperatures and more durable, takes in excess of one hour to manufacture.

Another problem with the manufacturing process of CMC components is that the large discrepancy between manufacturing times has the effect of drastically increasing the cost of a CMC brake pad compared to a traditional brake pad. This, in turn, has hindered the widespread use of CMC components in favor of components made from traditional materials.

Therefore, what is needed is a method of rapidly manufacturing a CMC component that yields a CMC component that retains its resistance to high temperature, strength and durability. Moreover, this method of rapid manufacture would in turn decrease the production costs of the CMC component and would allow the CMC component to compete in the marketplace with similar components made from traditional materials. Furthermore, what is also needed is a method for rapidly manufacturing CMC components that yields a mixture which has a long shelf life. This would permit preparation of the mixture well ahead of production and alleviate slowdowns in manufacturing.

Whatever the merits of the above-mentioned methods of manufacturing CMC components, they do not achieve the benefits of the present invention.

SUMMARY OF THE INVENTION

To overcome the limitations in the prior art as described above and other limitations that will become apparent upon reading and understanding the present specification, the present invention includes "green-state" CMC components made from a polymer-derived ceramic precursor resin and a method of rapidly manufacturing these components.

The method of the present invention permits "green-state" CMC components to be manufactured rapidly enough to drastically reduce the production time of the components. This generally leads to decreased production costs. Furthermore, this method yields rapidly manufactured "green-state" CMC components that have at least the temperature resistance, strength and durability of CMC components manufactured by much slower procedures. In addition, the present invention includes a mixture for making rapidly manufactured "green-state" CMC components whereby the mixture can be stored for an extended period of time.

In a preferred embodiment, the present invention includes a method for rapidly manufacturing a "green-state" CMC component. Specifically, a mixture is created by mixing together a polymer-derived ceramic precursor resin, a catalyst, a discontinuous fiber and a filler material. The resultant mixture then is dried and loaded into a preheated mold. The mixture is then cured in the mold until the "green-state" component is formed. Next, the component is ejected from the mold and reinfiltrated with a resin to fill any porosity in the component.

In some embodiments, the mixture includes only a polymer-derived ceramic precursor resin, a catalyst, and fiber. Furthermore, some embodiments omit the step of drying the mixture and the step of reinfiltrating the component with a resin.

The present invention also includes a "green-state" CMC component and the resin/catalyst mixture prepared by using the above methods.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not the preceding summary or the following detailed description.

BRIEF DESCRIPTION OF THE DRAWINGS

Referring now to the drawing in which like reference numbers represent corresponding parts throughout.

DETAILED DESCRIPTION OF THE PREFERRED EMBODIMENT

Figure 1:
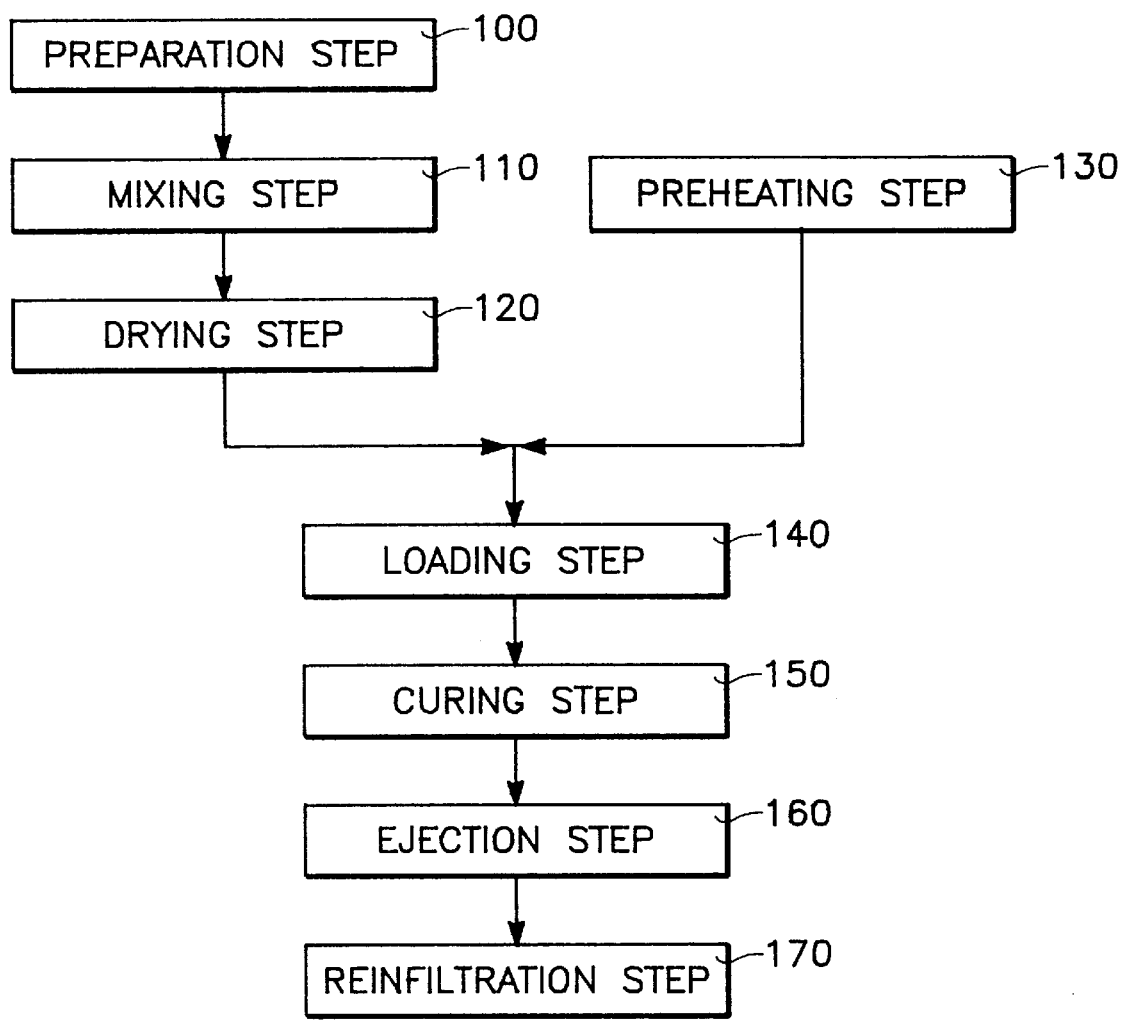
FIG. 1 is a flow process diagram of the preferred embodiment of the method of the present invention.

In the following detailed description of the preferred embodiment, reference is made to the accompanying drawings in which is shown by way of illustration a specific embodiment whereby the invention may be practiced. It is to be understood that other embodiments may be utilized and structural changes may be made without departing from the scope of the present invention.

I. Introduction

As shown in the drawings for purposes of illustration, the present invention is embodied in a "green-state" discontinuous fiber ceramic matrix composite component made from a polymer-derived ceramic precursor resin, a method of rapidly manufacturing this component and a resin/catalyst mixture used in the rapid manufacture of this component. Using the method of the present invention, a "green-state" CMC component can be manufactured in a short period of time. Furthermore, this component exhibits excellent temperature resistance, strength and durability after pyrolysis. In addition, the resin/catalyst precursor and fiber mixture can be stored for several weeks. Existing methods of CMC component fabrication are time intensive and expensive.

In the new method of the present invention, a resin/catalyst/fiber precursor mixture is created by mixing together a polymer-derived ceramic precursor resin, a catalyst, a discontinuous fiber and a filler material. The resultant mixture is then dried and loaded in a mold that has been preheated. The mixture is then cured in the mold until the "green-state" component is formed. Next, the component is ejected from the mold and reinfiltrated with a resin to at least partially fill the pores of the component.

Other embodiments of the invention are possible by varying the amounts of the ingredients, the mold temperature and the curing time. Moreover, the method can be varied by omitting the steps of drying the mixture and of reinfiltrating the component with the resin. In addition, the present invention includes a "green-state" CMC component and the resin/catalyst precursor mixture prepared by any one of the above methods.

II. Method of the Invention

FIG. 1 is a flow process diagram of the method of the present invention illustrating a preferred embodiment. The preparation step 100 of the method involves assembling and preparing the ingredients. These ingredients include a polymer-derived ceramic precursor resin, a catalyst, a reinforcing fiber and a filler material. Preferably, the polymer-derived ceramic precursor resin is Allied Signal's Blackglas™ 493E resin, the catalyst is Allied Signal's 493B catalyst, the filler material is silicon carbide and the reinforcing fiber is discontinuous Nextel 312 fiber which has been treated to create a boron nitride rich surface layer (commonly called an interfacial coating). Blackglas 493E resin is a medium viscosity polysiloxane resin solution with a molecular weight average of 1,000, and is identified and described in Material Safety Data Sheet (MSDS) Number ASRT.0012, issued Oct. 1, 1994. Blackglas 493B catalyst is a catalyst solution of inorganic siloxane complexes (0.1 wt. %–0.5 wt. %) and siloxane-based monomers, Si o C H (99.5 wt. %–99.9 wt. %) with a molecular weight of 200–1,000, and is identified and described in Material Safety Data Sheet (MSDS) Number ASRT.0018 issued Feb. 8, 1994. Nextel 312 ceramic fiber is manufactured by 3M Company, St. Paul, Minn., and is aluminoborosilicate fibers (97.0–99.0%)+hydroxy ethylated polyethyleneimide (0.5%–3.0%)+polyethylene glycol<0.5%). Nextel 312 is identified and described in Material Safety Data Sheet (MSDS) Document 10-4844-6 issued Jan. 25, 1996.

The precursor resin and the catalyst may be any one of a number of polymer-derived ceramic precursor resins and catalysts. Moreover, the filler material may be any number of materials non-limitedly including silicon carbide, alumina, mullite, titania, graphite, silicon nitride, and silica. Furthermore, the reinforcing fiber may be chosen from materials including alumina, Nextel 312, Nextel 440, Nextel 610, Nextel 550, silicon nitride, silicon carbide, HPZ, graphite, carbon and peat. Nextel 440 is manufactured by 3M Company, St. Paul, Minn., and is aluminoborosilicate fibers (97.0–99.0%)+hydroxy ethylated polyethyleneimide (0.5%–3.0%)+polyethylene glycol<0.5%). Nextel 440 is identified and described in Material Safety Data Sheet (MSDS) Document 10-4881-8 issued Jan. 25, 1996. Nextel 610 is manufactured by 3M Company, St. Paul, Minn., and is aluminum oxide (97.0–99.0%)+hydroxy ethylated polyethyleneimide (0.5%–3.0%)+polyethylene glycol<0.5%). Nextel 610 is identified and described in Material Safety Data Sheet (MSDS) Document 06-2278-7 issued Sep. 20, 1993. Nextel 550 is manufactured by 3M Company, St. Paul, Minn., and is alumina silicate fibers (97.0–99.0%)+hydroxy ethylated polyethyleneimide (0.5%–3.0%)+polyethylene glycol<0.5%). Nextel 550 is identified and described in Material Safety Data Sheet (MSDS) Document 06-2338-9 issued Jan. 25, 1996. HPZ is manufactured by Dow-Corning Corp., Midland, Mich., and is silicon carbide ceramic fiber. HPZ is identified and described in Material Safety Data Sheet (MSDS) having a revision date of Mar. 10, 1989, and showing a material name identification of "Dow Corning (R) X9-6371 P2-sized HPZ Ceramic Fiber". It should be noted that one of ordinary skill in the art would recognize that other equivalent ingredients may be used.

After the ingredients have been prepared in the preparation step 100, the ingredients are thoroughly mixed together during the mixing step 110 to create a resin/catalyst precursor mixture. The amount of ingredients in the precursor mixture can vary. Preferably, between about 50 to 85 percent of the theoretically required amount of the polymer-derived ceramic precursor resin is mixed with about 4 percent catalyst by weight. However, this percentage of catalyst may be as high as 10 percent by weight. In general, the greater the percentage of catalyst the shorter the cure time and shelf life. The reduced amount of resin from the theoretical amount is done to reduce cure time. Enough resin is used to create a part that will hold together during ejection from the mold. The part is then reinfiltrated to backfill the porosity.

The mixture is then dried during the drying step 120. This is typically accomplished using conventional drying techniques such as air drying, downdraft tables and ovens.

Meanwhile, in the preheating step 130 the mold used to form the component is preheated to between 450° F. and 600° F. The dried mixture from the drying step 120 is then added to the preheated mold during the loading step 140. Following the loading step 140, the mold is closed and the mixture is cured in the mold during the curing step 150. Typically, the mixture must cure in the mold for at least thirty seconds. However, shorter curing times may be possible if the percentage of catalyst in the precursor mixture is increased and the percentage of theoretical resin is decreased. The proper percentages can be achieved experimentally and are a function of catalyst percentage, hold temperature, part shape, and thickness.

After the curing step 150, the component has been formed within the mold. During the ejection step 160, the component is ejected from the mold. At this point the component has nominal structural integrity and can be handled. However, the component is resin-starved and porous, and is not a solid part ready for use.

To give the component more structural integrity, the component goes through the reinfiltration step 170. In this step, the component is reinfiltrated with a resin, preferably Blackglas™ 493A to fill the pores that occur during the curing step 150 from using less than the theoretical volumetric resin requirement. The reinfiltration step may be repeated as many times as desired. The resin fills the pores of the component each time the reinfiltration step 170 is performed. This reinfiltration step 170 ensure minimum porosity of the component. After the reinfiltration step 170, the component is ready for pyrolysis.

III. Products of the Invention

The present invention also includes a resin/catalyst precursor mixture. This precursor mixture is created during the mixing step 110.

The precursor mixture contains at least the polymer-derived ceramic precursor resin and the catalyst as described above. Moreover, as set forth above, the precursor mixture can include miscellaneous fillers and discontinuous fiber. This precursor mixture has exhibited a shelf life in excess of four weeks.

The present invention also includes a CMC component made by the above-described methods of the present invention. This component exhibits at least the same temperature resistance, strength and durability as other CMC components made from processes taking much longer.

IV. Working Example

The method of the present invention has been performed to produce a 0.5 inch thick "green-state" CMC brake pad. This method produced the brake pad in approximately one minute. Moreover, the brake pad exhibited the favorable properties of comparable CMC components made by much slower existing fabrication methods.

The brake pad was manufactured by creating a resin/catalyst precursor mixture. This precursor mixture was made by mixing together 4 percent by weight of catalyst with a polymer-derived ceramic precursor resin. In this case, the polymer-derived ceramic precursor resin was Allied Signal's Blackglas™ 493E resin, and the catalyst was Allied Signal's 493B catalyst.

Next, 20 percent by volume (of finished part) of the resin/catalyst precursor mixture, 25 percent by volume of a filler powder and 40 percent by volume of a discontinuous reinforcing fiber was mixed into the precursor mixture. In this case, the filler powder was silicon carbide and the discontinuous reinforcing fiber was Nextel 312 fiber with a boron nitride rich surface layer.

The mixture was then dried using a downdraft table. Meanwhile, a mold was preheated to a temperature of approximately 525° F. The mixture was then added to the preheated mold. Next, the mold was closed for approximately one minute, the mold was opened and the brake pad was ejected. Finally, the brake pad was reinfiltrated with resin to ensure minimum porosity. The resin used was Blackglas™ 493A low-viscosity resin.

This method yielded a 0.5 inch thick "green-state" brake pad that was ready for pyrolysis. Furthermore, the brake pad was cured in approximately one minute. Existing methods of fabrication required substantially longer curing times. Moreover, the brake pad exhibited the strength, durability and temperature resistance of a comparable CMC brake pad made by much slower existing methods.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for fabricating a green state ceramic matrix composite article of manufacture for subsequent pyrolysis, the method comprising the steps of:
   a) mixing for mixture formation an amount of a polymer-derived ceramic precursor resin, an amount of a catalyst, discontinuous reinforcing fibers, and a filler material, wherein the amount of precursor resin is between about 50 and 85 volume percent of a theoretically required amount for producing a substantially non-porous green state ceramic matrix composite article of manufacture and wherein the amount of catalyst is between about 4 wt. % and 10 wt. % of the mixture;
   b) drying the mixture;
   c) preheating a mold having a shape of the article of manufacture to a cure temperature for curing the mixture to a porous green state ceramic matrix composite article of manufacture;
   d) placing the mixture into the mold for a period of time sufficient to cure said mixture to said porous green state ceramic matrix composite article of manufacture;
   e) ejecting said article of manufacture from the mold; and
   f) filling a plurality of pores of said porous green state ceramic matrix composite article of manufacture with said polymer-derived ceramic precursor resin.

2. A method for fabricating a green state ceramic matrix composite article of manufacture as claimed in claim 1 wherein the polymer-derived ceramic precursor resin is polysiloxane resin having an average molecular weight of 1,000.

3. A method for fabricating a green state ceramic matrix composite article of manufacture as claimed in claim 1 wherein the catalyst comprises a siloxane-based monomer having a molecular weight between 200 and 1,000.

4. A method for fabricating a green state ceramic matrix composite article of manufacture as claimed in claim 1 wherein the discontinuous reinforcing fibers are fibers selected from the group consisting of alumina, aluminoborosilicate, aluminum oxide, aluminasilicate, silicon nitride, silicon carbide, silicon carbide, graphite, carbon, peat, and mixtures thereof.

5. A method for fabricating a green state ceramic matrix composite article of manufacture as claimed in claim 1 wherein the filler material is selected from the group consisting of silicon carbide, alumina, mullite, titania, graphite, silicon nitride, silica, and mixtures thereof.

6. A method for fabricating a porous green state ceramic matrix composite article of manufacture for subsequent pore infiltration with polymer-derived ceramic precursor resin and pyrolysis, the method comprising the steps of:
   a) mixing for mixture formation an amount of a polymer-derived ceramic precursor resin, an amount of a catalyst, discontinuous reinforcing fibers, and a filler material, wherein the amount of precursor resin is between about 50 and 85 volume percent of a theoretically required amount for producing a substantially non-porous green state ceramic matrix composite article of manufacture and wherein the amount of catalyst is between about 4 wt. % and 10 wt. % of the mixture;
   b) drying the mixture;
   c) preheating a mold having a shape of the article of manufacture to a cure temperature for curing the mixture to said porous green state ceramic matrix composite article of manufacture;

d) placing the mixture into the mold for a period of time sufficient to cure said mixture to said porous green state ceramic matrix composite article of manufacture; and e) ejecting said article of manufacture from the mold.

7. A method for fabricating a porous green state ceramic matrix composite article of manufacture as claimed in claim 6 wherein the polymer-derived ceramic percusor resin is polysiloxane resin having an average molecular weight 1000.

8. A method for fabricating a porous green state ceramic matrix composite article of manufacture as claimed in claim 6 wherein the catalyst comprises a siloxane-based monomer having a molecular weight between 200 and 1,000.

9. A method for fabricating a porous green state ceramic matrix composite article of manufacture as claimed in claim 6 wherein the discontinuous reinforcing fibers are fibers selected from the group consisting of alumina, aluminoborosilicate, aluminum oxide, aluminasilicate, silicon nitride, silicon carbide, silicon carbide, graphite, carbon, peat, and mixtures thereof.

10. A method for fabricating a porous green state ceramic matrix composite article of manufacture as claimed in claim 6 wherein the filler material is selected from the group consisting of silicon carbide, alumina, mullite, titania, graphite, silicon nitride, silica, and mixtures thereof.

11. A method for fabricating a green state ceramic matrix composite article of manufacture for subsequent pyrolysis, the method comprising the steps of:

a) mixing for mixture formation
   an amount of a polysiloxane ceramic precursor resin having an average molecular weight of 1,000,
   an amount of a siloxane-based monomer catalyst having a molecular weight between 200 and 1,000,
   discontinuous reinforcing fibers selected from the group consisting of alumina, aluminoborosilicate, aluminum oxide, aluminasilicate, silicon nitride, silicon carbide, silicon carbide, graphite, carbon, peat, and mixtures thereof, and
   a filler material selected from the group consisting of silicon carbide, alumina, mullite, titania, graphite, silicon nitride, silica, and mixtures thereof,
   wherein the amount of polysiloxane ceramic precursor resin is between about 50 and 85 volume percent of a theoretically required amount for producing a substantially non-porous green state ceramic matrix composite article of manufacture and wherein the amount of siloxane-based monomer catalyst is between about 4 wt. % and 10 wt. % of the mixture;

b) drying the mixture;

c) preheating a mold having a shape of the article of manufacture to a cure temperature for curing the mixture to a porous green state ceramic matrix composite article of manufacture;

d) placing the mixture into the mold for a period of time sufficient to cure said mixture to said porous green state ceramic matrix composite article of manufacture;

e) ejecting said article of manufacture from the mold; and f) filling a plurality of pores of said porous green state ceramic matrix composite article of manufacture with said polymer-derived ceramic precursor resin.

12. A method for fabricating a porous green state ceramic matrix composite article of manufacture for subsequent pore infiltration with polymer-derived ceramic precursor resin and pyrolysis, the method comprising the steps of:

a) mixing for mixture formation
   an amount of a polysiloxane ceramic precursor resin having an average molecular weight of 1,000,
   an amount of a siloxane-based monomer catalyst having a molecular weight between 200 and 1,000,
   discontinuous reinforcing fibers selected from the group consisting of alumina, aluminoborosilicate, aluminum oxide, aluminasilicate, silicon nitride, silicon carbide, silicon carbide, graphite, carbon, peat, and mixtures thereof, and
   a filler material selected from the group consisting of silicon carbide, alumina, mullite, titania, graphite, silicon nitride, silica, and mixtures thereof,
   wherein the amount of polysiloxane ceramic precursor resin is between about 50 and 85 volume percent of a theoretically required amount for producing a substantially non-porous green state ceramic matrix composite article of manufacture and wherein the amount of siloxane-based monomer catalyst is between about 4 wt. % and 10 wt. % of the mixture;

b) drying the mixture;

c) preheating a mold having a shape of the article of manufacture to a cure temperature for curing the mixture to a porous green state ceramic matrix composite article of manufacture;

d) placing the mixture into the mold for a period of time sufficient to cure said mixture to said porous green state ceramic matrix composite article of manufacture; and e) ejecting said article of manufacture from the mold.

* * * * *